INVENTOR.
LUDVIK J. KOCI
BY
George R. Clark
ATTORNEY

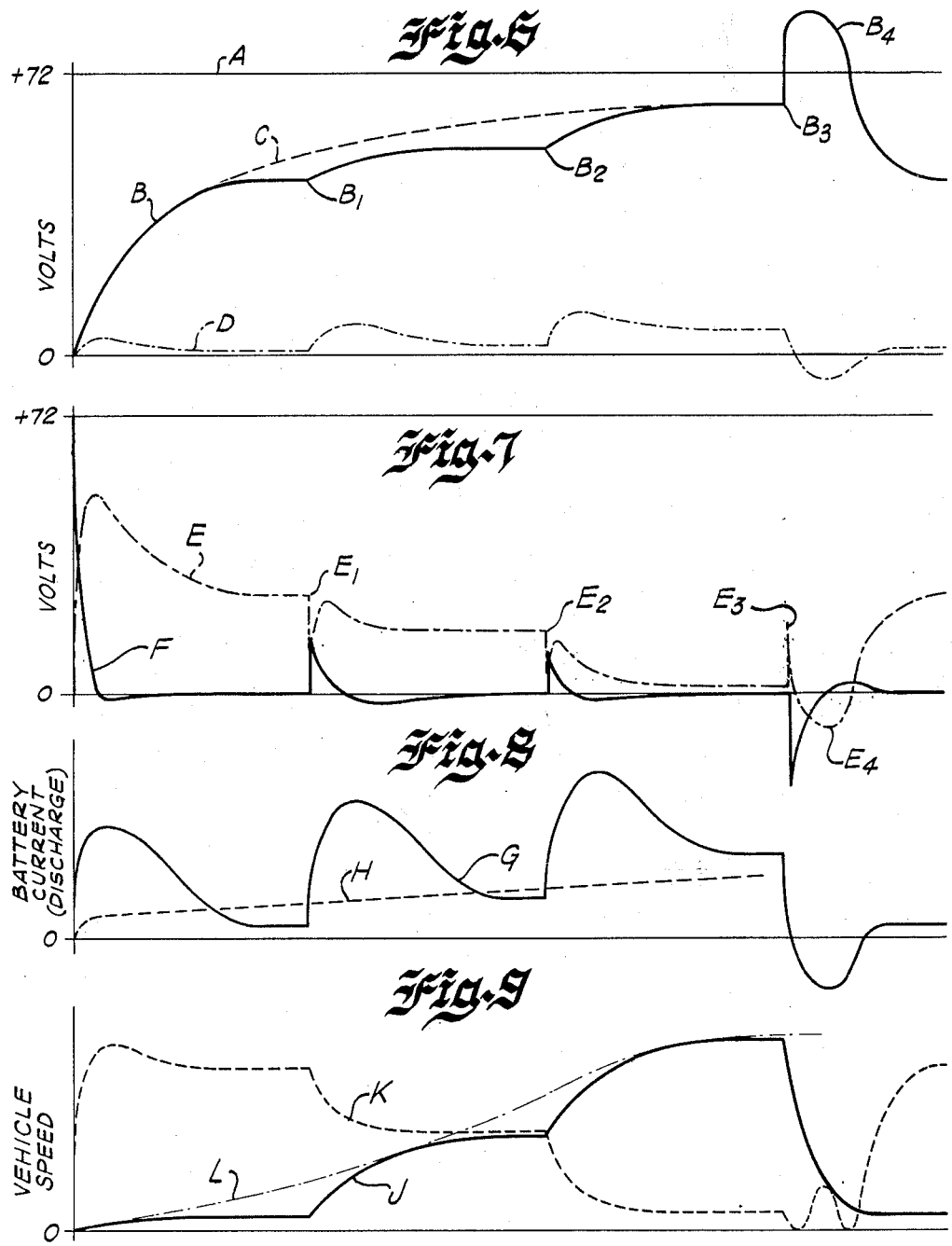

United States Patent Office 3,163,252
Patented Dec. 29, 1964

3,163,252
ELECTRIC MOTOR CONTROL
Ludvik J. Koci, Hinsdale, Ill., assignor to Sunbeam Corporation, Chicago, Ill., a corporation of Illinois
Filed Aug. 22, 1961, Ser. No. 133,093
8 Claims. (Cl. 180—65)

The present invention relates to a motor control, and more particularly to an improved control especially adapted for application to what is commonly termed an electrically propelled vehicle, such as an electric automobile.

Electric vehicles depending upon storage batteries for the energy source have been known for many years, and although they have been used in certain limited applications they have not been extensively used for a number of reasons. First of all, the so-called electric automobile using as its energy source storage batteries has a relatively limited range on the charge which can reasonably be contained in the storage batteries. This disadvantage has outweighed the inherent advantages of an electric vehicle insofar as simplicity, ease of operation and the like are concerned.

In recent years the habits of the people in this country have changed considerably. The population within the last decade has become predominantly urban and the two-car family has become commonplace. Often the two-car urban dweller has one automobile which is used primarily within an area not far distant from the user's home, while the other is principally used for longer trips. Consequently, insofar as the automobile which is used solely within an area relatively close to the user's home or place of work is concerned, the electric automobile becomes quite feasible, and the feasibility thereof depends primarily on the possible range of travel with a single battery charge. To this end, efficiency of operation becomes of prime consideration, while, of course, smooth acceleration and simplicity of design are secondary considerations. It is, of course, desirable in controlling such an electric automobile to have smooth acceleration and efficient operation of the traction motors with a single pedal-operated control means. Speed control of such devices has formerly been commonly attained by switching arrangements for controlling external current dissipating resistances and the like. Such arrangements are complex, are wasteful of power, and are far from satisfactory in operation. It would be desirable to provide an improved control arrangement in which, with a single pedal-operated control means, smooth acceleration could be obtained at all times with maximum efficiency.

It has been known since at least the turn of the century that the voltage at the terminals of a direct current primary or driving motor could be varied for the purpose of varying the speed of the motor by varying the speed of a secondary or control motor connected in series with the main or primary motor. With this arrangement the speed of the primary motor can be controlled without the switching of external resistances or the application of brakes. The secondary motor can be of relatively small size compared to the primary motor and it need not be connected to any load, whereby it has little inertia. It can readily come up to speed almost instantaneously when connected to a source of voltage. Thus, by using such motor it is unnecessary to use external resistances to prevent an effective short circuit through the main motor at starting. The small motor in effect serves as a substitute for the control resistance, since as the secondary or control motor speeds up it generates a substantial counter electromotive force opposed to the supply voltage, thus limiting the potential applied to the primary motor and permitting the latter to speed up gradually under load. The present invention involves an improved arrangement of such a control motor in series with a primary motor wherein the control motor is used to drive a fan load which, due to the nature thereof, still permits the control motor to come up to speed rapidly.

Accordingly, it is an object of the present invention to provide a new and improved electric motor control.

It is a further object of the present invention to provide an improved drive for an electric vehicle wherein the source of power comprises storage batteries.

It is another object of the present invention to provide a new and improved electric vehicle in which a maximum range of travel with a single reasonable battery charge is possible.

Still another object of the present invention resides in an improved electric vehicle in which smooth acceleration of the traction motor or motors and efficient operation thereof is obtained with a single pedal-operated control means and wherein braking is obtained by recovery of inertia energy during deceleration.

A still further object of the present invention resides in an improved motor control means particularly useful in an electric automobile in which efficient application of current to the motor, regardless of the desired acceleration, is obtained.

Another object of the present invention resides in an improved control in which efficient motor cooling under all conditions is obtained.

It is another object of the present invention to provide an improved motor control for an electric vehicle in which improved control means for taking advantage of regenerative braking is provided.

A further object of the present invention resides in a motor control wherein smooth acceleration of the driving motor is obtained by a control motor connected in series therewith, which control motor drives a load which is negligible at low speeds to permit high speed acceleration thereof.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIGS. 6, 7, 8 and 9 are curve diagrams to aid in understanding the operation of the present invention.

Briefly, the present invention is concerned with an electric vehicle drive in which one or more traction or primary motors of the compound direct current type are connected across a source of battery voltage. In order to provide an efficient control, a shunt field direct current control or secondary motor is connected in series with the traction or primary motor or motors. The control motor initially speeds up rapidly and absorbs the bulk of the battery voltage while the traction motors gradually speed up. A cooling fan is the only load on the secondary or control motor, and this load is inherently such as not to interfere with this motor coming up to speed almost instantly with the application of power thereto. The primary or traction motor or motors also drive cooling fans, and air ducts are provided so that the control motor which rotates at high speed initially will cause cooling of the traction motors while they initially operate at low speeds, and subsequently, as the speed of the traction motor or motors increases, the bulk of the cooling is produced by the traction motor fans which then operate at high speeds. Additionally, means are provided to prevent the application of too much current to the traction or primary motors initially which would cause them to reach electrical saturation and operate inefficiently. All of this is accomplished by a single simple pedal-operated control with means whereby upon sudden release of the pedal regenerative braking will result with maximum efficiency in every facet of the operation.

In the detailed description included hereinafter reference is made to the accompanying drawings which schematically illustrate the motor control of the present invention in connection with an electric vehicle. It should be understood that, although the present control is particularly well adapted for use with so-called electric automobiles, it has numerous other applications wherein direct current series motors are used to apply a torque and the load should be accelerated uniformly and with maximum efficiency. Hoists or lifting devices are other examples.

Figure 1:
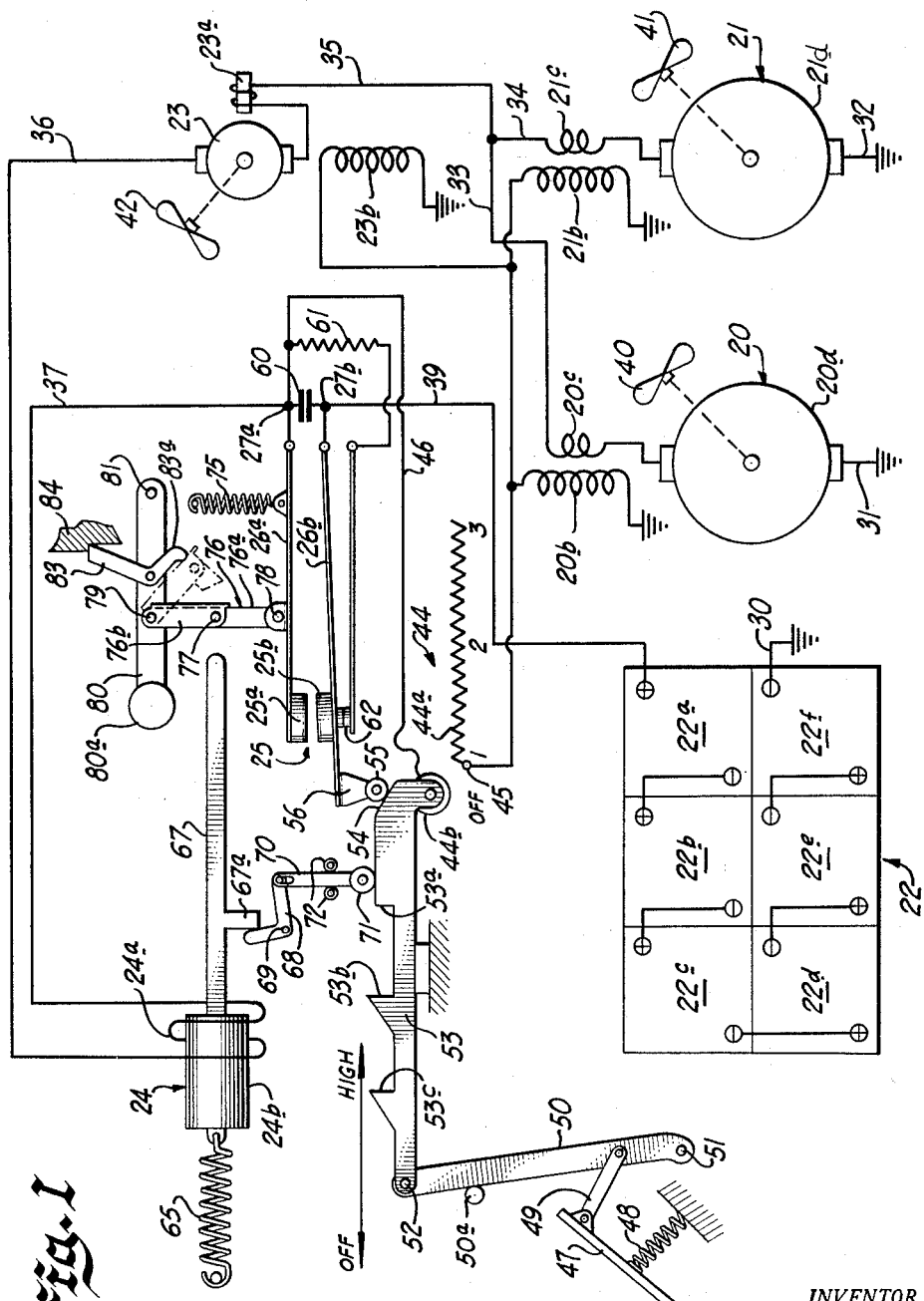
FIG. 1 is a schematic diagram illustrating the electric motor control of the present invention with the control in the "Off" position.
Figure 2:
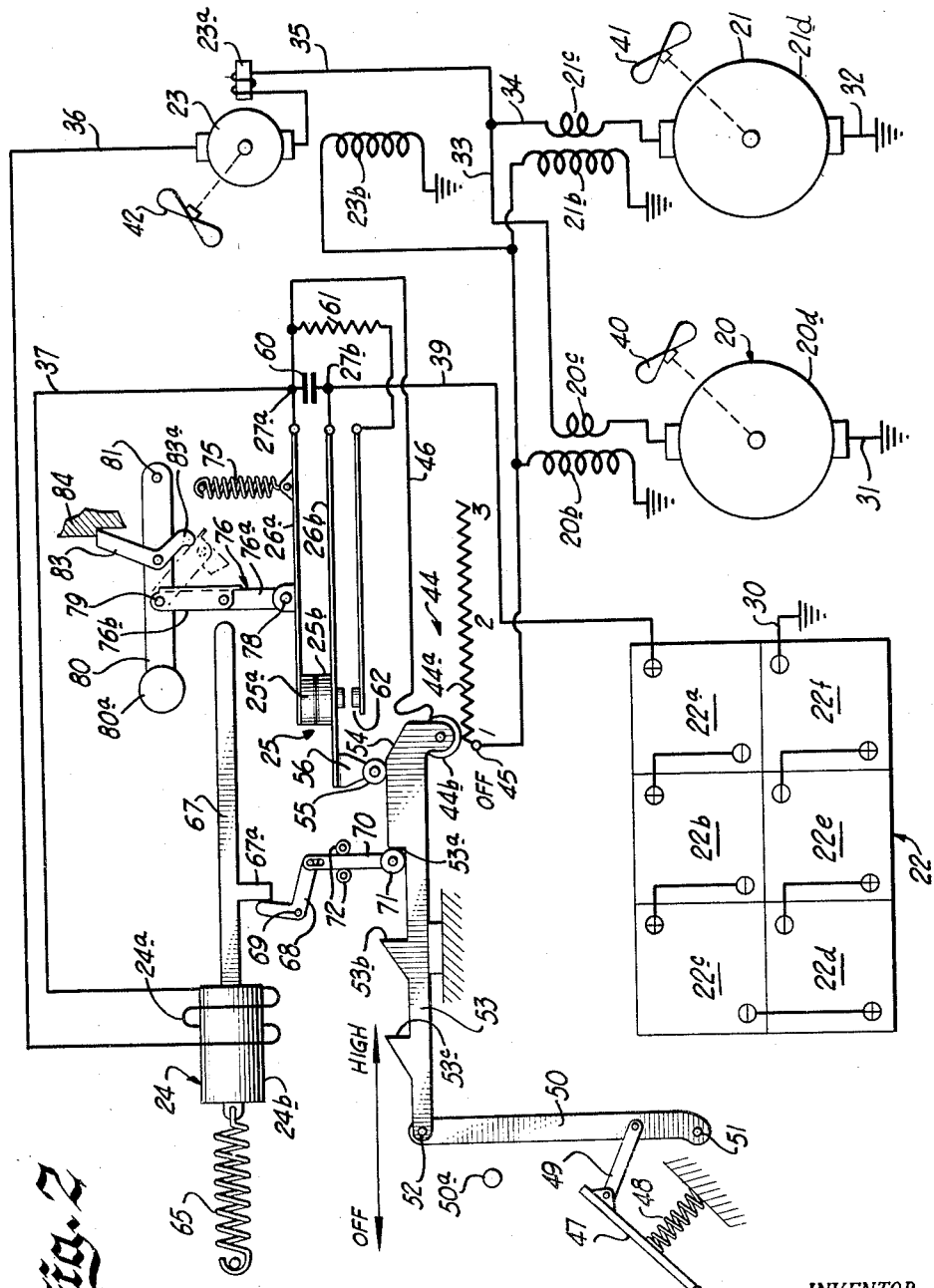
FIG. 2 is a schematic diagram similar to FIG. 1 but showing the control in an intermediate position.
Figure 3:
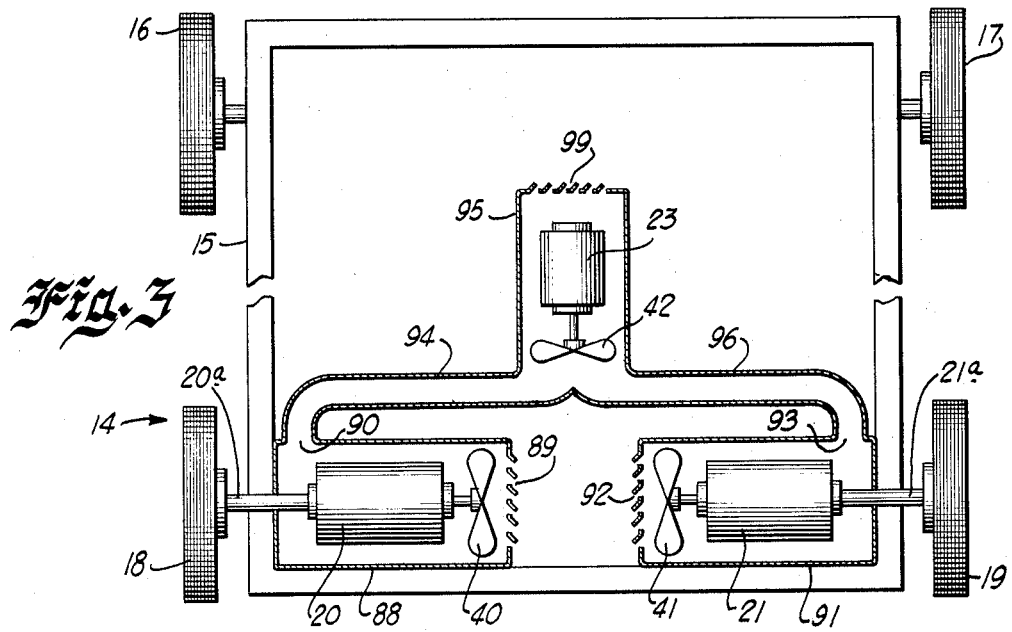
FIG. 3 is a somewhat schematic diagram of the motors of FIGS. 1 and 2 illustrating the improved cooling arrangement of the present invention.

Referring now to the drawings and particularly to FIGS. 1, 2 and 3 thereof, there is illustrated an application of the present invention to an electric vehicle generally designated by the reference numeral 14 in FIG. 3 of the drawings, where such vehicle is only partially and very schematically shown as comprising a frame 15 supported on four wheels 16, 17, 18 and 19, the latter two comprising traction wheels. A pair of traction or primary electric motors 20 and 21 are illustrated as having their output shafts 20a and 21a, respectively, drivingly connected to traction wheels 18 and 19, respectively. As schematically illustrated in FIGS. 1 and 2 of the drawings, the primary motors 20 and 21 are illustrated as compound wound direct current motors, the motor 20 having a shunt field 20b, a series field 20c and an armature 20d, while the motor 21 is illustrated as comprising a shunt field 21b, a series field 21c and an armature 21d.

Since the present invention is particularly concerned with a control arrangement wherein the source of power is a storage battery, the energy of which is to be conserved for operation in the most efficient manner, there is illustrated a power source generally designated at 22. In an embodiment built in accordance with the present invention, six 12-volt storage batteries designated as 22a, 22b, 22c, 22d, 22e and 22f were connected in series, as illustrated in the drawings, to provide a 72-volt direct current battery source. The primary motors 20 and 21 were connected in parallel with each other, as clearly indicated in the drawings, and to the source of battery voltage 22 through a secondary or control motor 23, winding 24a of an electromagnet 24 having an armature 24b, and a main power switch 25 having a normally relatively stationary contact 25a and a relatively movable contact 25b. This main switch 25 is shown in the open position in FIG. 1 of the drawings and in the closed position in FIG. 2 of the drawings. The switch 25 is illustrated as comprising switch arms 26a and 26b supporting the contacts 25a and 25b, respectively, and switch terminals 27a and 27b associated, respectively, with switch arms 26a and 26b. Specifically, the motor power circuit includes the negative terminal of storage battery source 22 connected to ground through conductor 30. Similarly, ground conductors 31 and 32 connect one terminal of each of the motors 20 and 21, respectively, to ground. The other terminals of the motors 20 and 21 including the series fields 20c and 21c are connected in parallel by conductors 33 and 34 and in series with one terminal of the control motor 23 through a conductor 35. Preferably, the control motor 23 has one or more commutating poles 23a with the conventional winding connected in series with the armature circuit of motor 23. The control motor 23 also includes a shunt field 23b. The other terminal of the control motor 23 is connected by a conductor 36 to one terminal of the winding 24a of the electromagnet 24. The other terminal of winding 24a is connected through a conductor 37 to the terminal 27a of the switch 25. The other terminal 27b of the switch 25 is connected by a conductor 39 with the positive terminal of storage battery source 22.

For cooling purposes each of the traction motors 20 and 21 is drivingly connected to a cooling fan designated as 40 in the case of traction motor 20, and 41 in the case of traction motor 21. Similarly, the control motor 23 is provided with a cooling fan 42 which effectively provides a load for the control motor which is otherwise not connected to any other load. It will be understood that the control or secondary motor 23 must have a low inertia and be capable of developing very rapidly a back or counter electromotive force in the motor circuit. In a device designed in accordance with the present invention, the traction motors 20 and 21 comprised five horsepower motors and the control motor 23 comprised a one-fourth or one-half horsepower motor wound to carry the same current as the traction motors 20 and 21. The control motor might well comprise a 12-volt starter motor such as is commonly used in automobiles today.

For the purpose of supplying a suitable energization current for the shunt fields of each of the motors 20, 21 and 23, there is provided a circuit connecting each of the shunt fields 20b, 21b and 23b in parallel with each other and to the source of battery voltage 22 through an adjustable rheostat 44 comprising a resistance 44a and sliding contact 44b. As illustrated in the drawings, corresponding terminals of the shunt fields 20b, 21b and 23b are connected to ground, and the other terminals are connected in parallel to one terminal 45 of the resistor 44a of rheostat 44. The sliding or roller contact 44b of this rheostat is adapted to contact the resistor at various points therealong, as is well understood by those skilled in the art, to vary the impedance of the shunt field circuit and, hence, the current flow through these shunt fields. As illustrated, the contact 44b is connected by a conductor 46 to the terminal 27a of the switch 25. Consequently, the switch 25 controls not only the supply of voltage to the armatures (and series fields where provided) of the motors 20, 21 and 23, but also controls the application of voltage to the shunt fields 20b, 21b and 23b, respectively, of these respective motors. It will be understood that, if desired, a separate resistance may be employed for varying the shunt field current of control motor 23 rather than a resistor common to the shunt field circuits of all the motors.

To provide a single pedal-operated control means for the battery powered device of the present invention, there is schematically illustrated a foot pedal 47 normally biased to the "Off" position as by a compression spring 48. This foot pedal is connected by a link 49 to a lever 50 preferably pivoted at one end about a fixed pivot 51. The lever 50 has the free end thereof pivotally connected as indicated at 52 to a longitudinally movable control rod 53 which performs a number of functions including control of the main switch 25. To this end the control rod 53 is provided with a cam surface 54 engageable by a cam follower 55 secured to a projection 56 of the switch arm 26b supporting the movable contact 25b of the switch 25. It will be apparent from the drawings that with the control rod 53 in the position shown in FIG. 1 the switch 25 is in the open position. However, upon longitudinal movement of the control rod 53 toward the right, as viewed in FIG. 1, cam follower 55 rides up the cam surface 54 with the resultant closing of the switch 25. A suitable stop 50a is provided to determine the "Off" position of the control rod 53. Simultaneously with the initial closing of switch 25 described above, the roller 44b of rheostat 44 will make contact with the resistor 44a to apply battery voltage to the shunt fields 20b, 21b and 23b of the associated motors 20, 21 and 23, respectively. The current flowing through the resistor 44a for the motors, referred to above, will be relatively small of the order of between one-half to one-eighth of an ampere and no current interrupting problem is involved.

This is not true, however, with respect to the current flowing through the armatures of the motors 20, 21 and 23, which is substantial, and consequently suitable arc suppressing means are preferably provided for the switch 25. To this end a capacitor 60 is illustrated as being connected across the terminals 27a and 27b of switch 25, and a discharge circuit for this capacitor is provided comprising a series connected resistor 61 and a switch 62. As illustrated, the switch 62 has a movable contact supported by switch arm 26b whereby switch 62 is closed when the switch 25 is open, and open when the switch 25 is closed. In this way the arc voltage across contacts 25a and 25b of switch 25 upon interruption of the circuit at these contacts will appear across the capacitor 60 and a discharge circuit for dissipating this voltage through the resistor 61 is provided upon closing of the switch 62.

In accordance with the present invention, the electromagnet 24 is a dual purpose device in that it functions as a safety device to open switch 25 and disconnect the battery 22 from the motors 20, 21 and 23 in the event of a short circuit or the like. Additionally, it functions as an efficiency control to insure top efficiency of operation of the traction motors 20 and 21. In this latter respect it functions to prevent the application of too much current to these motors. It will be appreciated that if the current supplied from the storage battery source 22 to the main or traction motors 20 and 21 exceeds a predetermined value, saturation of the iron will result and a proportional increase of torque with respect to current will not obtain thereafter. Consequently, it would be desirable to limit the permissible flow of the current to that which will not produce saturation but will produce maximum efficiency of operation commensurate with torque output. To this end the electromagnet 24 includes a spring 65 which normally biases the armature 24b to the position indicated in FIG. 1 of the drawings. The armature 24b controls the positioning of a control rod 67 having a lug 67a for actuating a bell crank 68 pivoted to a fixed pivot 69, one arm of the bell crank being engageable by the lug 67a. The other arm of the bell crank 68 is connected to a vertically movable link 70 having a stop roller 71 at the lower end thereof for cooperation with rod 53. Suitable means 72 confine movement of link 70 to vertical movement. It will be apparent that the vertical positioning of the stop roller 71 is determined by the position of the armature 24b and the control rod lug 67a connected thereto. As current flowing through winding 24a of electromagnet 24 increases, the armature 24b will be moved to the position shown in FIG. 2 of the drawings, with corresponding movement of the lug 67a to the right thereby permitting stop roller 71 to move downwardly under the force of gravity or, if desired, by suitable spring means not shown. The stop roller 71 is adapted to engage with suitable shoulders or lugs 53a, 53b and 53c defined on rod 53 to control the same automatically in response to the current flow in the circuit of motors 20, 21 and 23.

Although the resistance of the speed controlling shunt field resistor 44 is variable through small increments, for the purpose of describing the operation of the present invention, four positions of control rod 53 are indicated as the "Off" position and Positions 1, 2 and 3. As mentioned above, the control is shown in the "Off" position in FIG. 1 and in Position 1 in FIG. 2. Position 1 is the low speed position with maximum shunt field current flowing through the shunt fields of motors 20 and 21, Position 2 is an intermediate speed position, and Position 3 is the high speed position with minimum shunt field current.

In accordance with the present invention, the lugs 53a, 53b and 53c are effective in Positions 1, 2 and 3, respectively. As shown in FIG. 2, the lug 53a will limit movement to the left of rod 53 upon reaching Position 1 for a purpose described hereinafter. Lugs 53b and 53c will limit movement to the right of rod 53 when moving from Position 1 to Position 2, and from Position 2 to Position 3, respectively. Thus, the lugs 53b and 53c prevent excess current flow and thereby insure maximum efficiency as far as the traction motors 20 and 21 are concerned, while the lug or shoulder 53a insures that dynamic braking is obtained. Starting with the system in the condition of FIG. 1, to start the vehicle the operator will depress the foot pedal 47 moving control rod 53 first from the position of FIG. 1 to the position of FIG. 2, and then successively to Positions 2 and 3. If in moving from Position 1 to Position 2 excessive current flows through winding 24a, the operator will not be able to move the control rod beyond the point where lug 53b engages stop roller 71. When the speed of the traction motors 20 and 21 has increased sufficiently, the current flow through winding 24a reduces and spring 65 will move relay armature 24b to the left with the result that stop roller 71 is raised and longitudinally movable control rod 53 is free to move further to the right without interference from roller 71. A second similar stop 53c prevents currents which would cause inefficient operation of the traction motors from flowing while control rod 53 is moved from Position 2 to Position 3. These stop lugs 53b and 53c are provided with an inclined surface on the back side so that reverse movement of the control rod 53 will not be stopped by the roller 71.

In the event the operator holds the foot pedal 47 in a position so that the control rod 53 is in Position 3, and then suddenly releases his foot, it will be appreciated that the shunt field current will be increased to maximum value with the result that the motors which have been rotating at high speed generate a back electromotive force higher than the applied battery voltage which will produce a regenerative braking action, which is desirable under the circumstances. Obviously, this braking action cannot take place if switch 25 is opened. Stop or shoulder 53a insures such dynamic braking action since it engages stop roller 71, and switch 25 cannot be opened until the motor current flowing through winding 24a reduces to such an extent that effective dynamic braking no longer obtains. Obviously, when the current flow through the motors 20 and 21 and, consequently, the winding 24a is reduced sufficiently, the spring 65 will move the roller 71 out of the interfering position shown in FIG. 2 of the drawings, and the spring 48 will return the control mechanism to the "Off" position shown in FIG. 1 of the drawings.

It will be appreciated that a short circuit or some other type of fault could occur on the vehicle control system described above, and in such case it is important that the switch 25 be opened very rapidly. To this end the operating rod 67 connected to the armature 24b of electromagnet 24 is preferably designed to actuate a mechanism for interrupting the power supply circuit to the motors 20 and 21. Obviously, a separate safety switch could be incorporated in this circuit, but, as schematically illustrated in the drawings, the electromagnet 24 causes movement of stationary contact 25a of switch 25 away from movable contact 25b. As illustrated in the drawings, a suitable tension spring 75 is connected to switch arm 26a in a manner tending to bias stationary contact 25a away from movable contact 25b. In order to hold contact 25a in its normal stationary position, there is provided a toggle mechanism comprising a toggle 76 including link 76a and link 76b pivotally connected by pivot pin 77 to define the knee of the toggle joint. The free end of link 76a is illustrated as being pivotally connected to contact supporting arm 26a as by pivot means 78. The free end of toggle link 76b is pivotally connected as indicated at 79 to a reset lever 80 pivotally supported by fixed pivot pin 81. Reset lever 80 includes a manually actuatable reset knob 80a. Preferably, a suitable spring, not shown, associated with the knee of toggle 76 tends to bias the toggle links 76a and 76b into the position shown in solid lines in FIGS. 1 and 2 of the drawings. A bell crank latch 83 pivotally mounted on the reset lever 80 includes a latching arm engageable with a fixed latch 84. This bell crank includes a portion 83a disposed in the path of the knee of the toggle 76.

The relationship of the rod 67 and the toggle 76 is that clearly illustrated in the drawings, so that when an excessive current flows through the power circuit the end of the rod 67 engages the knee of the toggle 76, quickly moving the same to the dotted line position shown to trip the bell crank latch 83, whereupon tension spring 75 holds normally stationary contact 25a in the open position, the circuit being quickly interrupted at switch 25. A suitable latching spring, not shown, is preferably associated with the bell crank 83 biasing it into the latching position indicated in FIGS. 1 and 2 of the drawings. The overcurrent control mechanism comprising the toggle 76 may be manually reset by grasping the knob 80a and manually moving the stationary contact 25a to its normal stationary position shown in FIGS. 1 and 2 of the drawings, with the bell crank latch 83 holding the same in that position against the biasing force of tension spring 75.

In a device designed in accordance with the present invention, the electromagnet 24 prevented currents in excess of thirty to thirty-five amperes from flowing during acceleration of the motors 20 and 21, since it was found that maximum efficiency of operation even with reasonable acceleration was obtained if the motor currents during acceleration did not exceed these values.

An important feature of the present invention resides in the cooling arrangement provided. As illustrated in FIG. 3 of the drawings, the motor 20 is mounted in a housing 88 having an air inlet 89 and an air outlet 90 to permit cooling air to flow over the motor. Similarly, the motor 21 is provided with the housing 91 having an air inlet 92 and an air outlet 93. In this manner the fans 40 and 41 cause cooling air to flow over the motors 20 and 21. However, it will be appreciated that under heavy load conditions the motors 20 and 21 are rotated relatively slowly and yet the maximum cooling action is required due to the high current flow. To insure proper cooling at all conditions of operation, the fan 42 driven by the control motor is arranged to also produce cooling of the motors 20 and 21. As illustrated, the cooling air outlet 90 from housing 88 is connected by a duct 94, with a housing 95 enclosing the motor 23 and fan 42. Similarly, the outlet 93 of the housing 91 enclosing the motor 21 is connected by a duct 96 with the housing 95. Thus, at starting and at high load conditions on motors 20 and 21, the control motor 23 will cause its fan 42 to operate at high speed and will cause the desired flow of cooling air not only over the control motors 20 and 21 but also over control motor 23. The cooling air exhaust opening from housing 95 is designated by the reference numeral 99. Preferably, the time constant of the control motor 23 approximates that of the inductance of the power circuit, which means that the control motor 23 will come up to speed almost instantaneously. It will be appreciated that the cooling required for the traction motors is proportional to the square of the current in the power circuit rather than to the speed of the traction motors, and by virtue of the cooling arrangement disclosed in FIG. 3 ideal cooling is obtained under all conditions.

Figure 4:
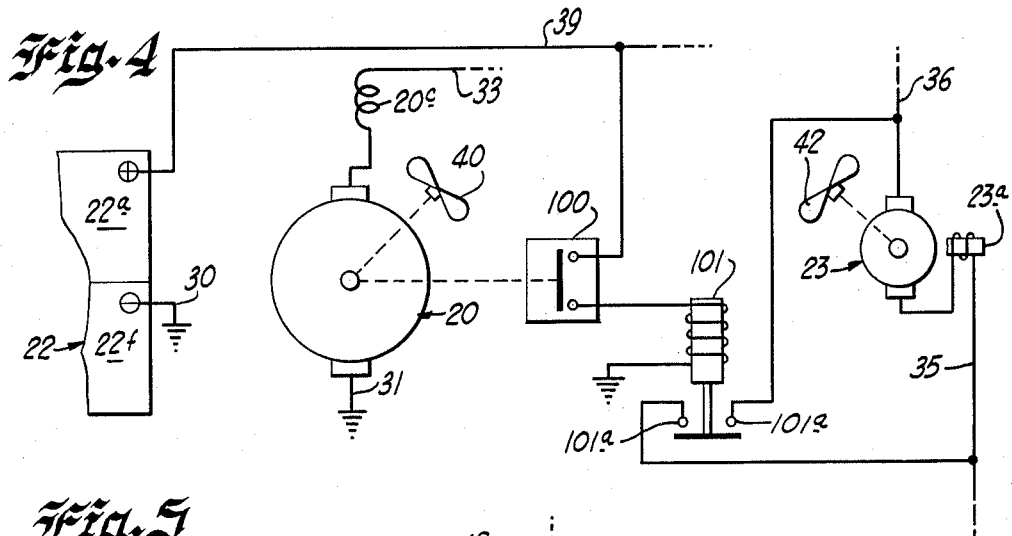
FIG. 4 is a schematic diagram of a portion of FIG. 1 illustrating a modification of the invention.

It will be understood that when the traction motors have accelerated to the full speed, the voltage drop across the control motor 23 is almost negligible, and this control motor will rotate at very low speed, the applied voltage being essentially that due to brush resistance plus armature resistance. If desired, means may be provided to eliminate this motor from the circuit under these conditions. In FIG. 4 of the drawings such an arrangement is disclosed, and the corresponding parts of FIG. 4 are designated by the same reference numerals as in the preceding figures. As there illustrated, one of the traction motors, such as 20, is provided with a governor controlled switch generally designated at 100. This governor controlled switch is normally open and is closed only when a predetermined speed of the traction motor 20 is obtained. Furthermore, the switch 100 is connected in the energization circuit of a relay 101 so that upon closing of governor controlled switch 100 the relay 101 is energized to close normally open 101a connected in a circuit bypassing motor 23.

Figure 5:
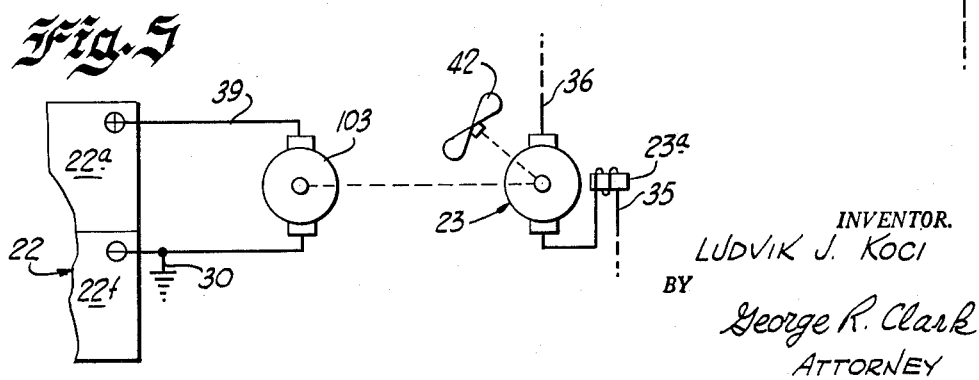
FIG. 5 is a schematic diagram similar to FIG. 4 illustrating another modification.

If the fan load provided by fan 42 is not sufficient for control motor 23 under all conditions, a suitable generator load may be connected thereto for charging the battery source 22. This arrangement is schematically illustrated in FIG. 5 of the drawings, wherein a generator 103 driven by control motor 23 has its output terminals connected in a charging circuit for battery source 22.

In view of the detailed description included above, the operation of the motor control system of the present invention will readily be understood by those skilled in the art. In FIG. 6 of the drawings there has been illustrated by the curve A the battery voltage of the battery source 22, designated as 72 volts, and by the curve B there has been illustrated the voltage across the terminals of the parallel connected traction motors 21 and 22 showing the condition from a standstill to full speed, with the maximum depression of the pedal 47, followed by quick release of the pedal after full speed is attained. In dashed lines, by the curve C in FIG. 6, this voltage is illustrated with smooth pedal increase as contrasted with the rapid pedal depression represented by curve B. Curve D in FIG. 6 illustrates the total voltage drop due to resistance of the power circuit for the same conditions ensuing to produce the curve B. Similarly, in FIG. 7, drawn to the same coordinates and for the same conditions, there is represented by the curve E the voltage across the control motor 23, and by the curve F the total inductive drop in the circuit. It will be understood, of course, that the sum of the voltages as represented by the curves B, D, E and F must equal the battery voltage A at every instant.

The abrupt changes in these curves are occasioned by virtue of the stops 53a, 53b and 53c. For example, as indicated in FIGS. 6 and 7, the point $B_1$ on the curve B and the point $E_1$ on the curve E are caused by virtue of the fact that the stop 53b has engaged the stop roller 71, thus preventing the inefficient application of excess current to motors 20 and 21. Similarly, the points $B_2$ and $E_2$ on the curves B and E illustrate the condition where the stop 53c has engaged the stop roller 71. The points $B_3$ and $E_3$ on the curves B and E, respectively, indicate the point where the operator, upon reaching full speed operation of the traction motors 20 and 21, suddenly releases the foot pedal 47. This sudden change in the shunt field current of the traction motors causes them to function as generators, and the portion $B_4$ of the curve B shows that the voltage across the traction motors 20 and 21 exceeds the battery voltage. On the other hand, the voltage across the control motor 23 at this instant, represented by the position $E_4$ of the curve E, is negative, and actual reversal of the direction of rotation of the control motor 23 occurs.

In FIG. 8 there is illustrated by the curve G the flow of battery current with the particular nonuniform pedal increase illustrated in FIGS. 6 and 7, whereas the dashed curve H illustrates the battery current that would obtain with smooth pedal increase. In FIG. 9 the area under the solid curve J represents the cooling effect in cubic feet per minute with different motor speeds of the traction motors 20 and 21, and the area under the dashed curve K represents the same cooling effect with respect to vehicle speed of the control motor 23, the area under a curve comprising the sum of these curves representing over-all cooling at all times, which obviously is ideal. The dot-dash curve L in FIG. 9 of the drawings shows the cooling produced by the traction motor with smooth pedal increases as contrasted with that of curve J.

It will be appreciated from the above description that there has been provided an arrangement in which efficient application of current to the traction motors, regardless of the desired acceleration, is provided. This is based upon the principle that to maintain efficiency one must apply only that magnitude of current as to be efficiently used by the traction motors for highest acceleration. Additionally, there has been provided an arrangement where efficient motor cooling results, the cooling being approximately proportional to the square of the current, which is much more representative of the cooling required than the speed of the motor shafts. When such a vehicle is climbing a long hill, the speed of the main motor shafts may be low yet high cooling is required.

Furthermore, with the arrangement described, the full battery voltage is applied across the series combination of control motor 23 and parallel arranged traction motors 20 and 21. The control motor, being of low inertia and having a time constant approximating the inductance of the circuit, accelerates quickly, thus producing a high induction drop in the circuit limiting the current flow in the traction motors. Moreover, the control is accomplished with a single simple pedal control. Furthermore, at top speed of the traction motors the voltage drop of the control motor will be little more than that of brush contact resistance plus armature resistance, and it may be eliminated from the circuit in accordance with the modification of FIG. 4, if desired.

The arrangement described above provides a very efficient power arrangement for a motor vehicle intended for use over a limited area. If it is desired to utilize such vehicle for travel over much greater areas, in fact unlimited areas, while still maintaining the high efficiency of operation, a small portable engine driven electric generator could be provided which might be in the form of an accessory removably mounted on the vehicle when the vehicle is intended for long range travel. It could be added thereto or removed therefrom in a matter of seconds. The generator would be utilized to charge the battery, and a coulometer (which indicates degree of charge) would be employed which would automatically start the engine driving the generator whenever the stored energy in the battery 22 had been reduced a predetermined amount. This engine would be stopped by a control device when the desired battery voltage is obtained. Such a device might be able to sense the start of "gassing" in the battery and stop the flow of charging current. Under these conditions the engine driving the generator would operate at peak efficiency, and of course the battery 22 would supply the necessary starting energy. In this way the limited range vehicle described above could be made into a long range vehicle still operating at very high efficiency.

The portable engine for driving the electric generator might be gasoline, diesel or steam, and it need be only of a size to supply the average power requirement and not the peak power requirement. Moreover, this engine, when operated, would always operate under a condition of full throttle and at the most efficient and constant speed. Thus, the maximum efficiency would also be obtained when the vehicle of the present invention is converted to a long range vehicle.

While there have been illustrated and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. An electrically driven vehicle comprising a traction wheel, an electric traction motor drivingly connected to said traction wheel, a storage battery source of electric energy mounted on said vehicle, circuit means interconnecting said source and said motor, a control motor connected in series with said traction motor, a fan driven by said control motor, and means for utilizing said fan to cool said traction motor.

2. The vehicle of claim 1 wherein said fan is utilized to cool both of said motors.

3. In an electrically driven vehicle, the combination of a traction wheel, an electric traction motor drivingly connected to said traction wheel, a storage battery source of electric energy mounted on said vehicle, circuit means interconnecting said source and said motor, a control motor connected in series with said traction motor, a first fan driven by said traction motor, a second fan driven by said control motor, and means for utilizing said fans to cool both of said motors whereby efficient cooling of said traction motor occurs even at very low speeds thereof.

4. An electrically driven vehicle comprising a frame, wheels including a traction wheel supporting said frame, an electric traction motor drivingly connected to said traction wheel, a storage battery source of electric energy mounted on said frame, circuit means interconnecting said source and said motor, a control motor connected in series with said traction motor and said source to limit the current through said traction motor at low speeds thereof, a first fan driven by said traction motor, a second fan driven by said control motor, and duct means for causing air movement produced by both said fans to pass over both motors to cool the same.

5. In an electric automobile, a frame, a plurality of wheels supporting said frame, at least two of said wheels comprising traction wheels, a plurality of electric traction motors each drivingly connected to a different one of said traction wheels, a storage battery source of electric energy mounted on said frame, circuit means connecting said traction motors in parallel with each other and to said source whereby power for driving said automobile is obtained from said storage battery, a control motor connected in series with said parallel connected traction motors to limit the current through said traction motors at low speeds of said traction motors, a plurality of fans one driven by each of said traction motors, a fan driven by said control motor, and means for utilizing all of said fans in a cooling system to cool both said traction motors and said control motor.

6. In an electric automobile, a frame, a plurality of wheels supporting said frame including a traction wheel, an electric traction motor drivingly connected to said traction wheel, a storage battery source of electric energy mounted on said frame, circuit means interconnecting said source and said traction motor whereby power for driving said automobile is obtained from said storage battery, a control motor connected in series with said traction motor, said traction motor rotating at low speed upon starting of said vehicle while said control motor rotates at high speed under these conditions, a plurality of fans one driven by each of said motors, and means for utilizing said fans to cool both of said motors to insure adequate cooling at all speeds of said traction motor.

7. The automobile of claim 6 wherein said control motor is rendered ineffective when a predetermined speed of said traction motor is attained.

8. The automobile of claim 6 wherein said control motor is drivingly connected to an electric generator connected to supply charging current to said storage battery.

References Cited in the file of this patent

UNITED STATES PATENTS

| | | |
|---|---|---|
| Re. 12,180 | Wadell | Dec. 8, 1903 |
| 394,735 | Stevens | Dec. 18, 1888 |
| 641,453 | Hunter | Jan. 16, 1900 |
| 653,199 | Munson | July 3, 1900 |
| 1,049,115 | MacFarlane et al. | Dec. 31, 1912 |
| 1,189,193 | Cumont | June 27, 1916 |
| 1,751,424 | Rosenthal | Mar. 18, 1930 |
| 2,586,273 | Steven | Feb. 19, 1952 |
| 2,715,201 | Manecke | Aug. 9, 1955 |
| 2,937,706 | Chandler | May 24, 1960 |

FOREIGN PATENTS

| | | |
|---|---|---|
| 549,265 | Great Britain | Nov. 13, 1942 |